United States Patent
Uehara et al.

[11] Patent Number: 6,042,740
[45] Date of Patent: Mar. 28, 2000

[54] COMPOSITION FOR FORMING ELECTROLYTE FOR SOLID ELECTROLYTIC CAPACITOR AND SOLID ELECTROLYTIC CAPACITOR

[75] Inventors: Hideaki Uehara, Hitachi-ota; Toru Yoshikawa, Hitachi; Yan Hu, Onoda; Shouichi Sasaki, Hitachi; Yasuhiro Yano; Takafumi Doudou, both of Ichihara, all of Japan

[73] Assignee: Hitachi Chemical Co., Ltd., Tokyo, Japan

[21] Appl. No.: 09/065,157

[22] Filed: Apr. 23, 1998

[30] Foreign Application Priority Data

Apr. 23, 1997 [JP] Japan ................................ 9-106042

[51] Int. Cl.[7] ........................................... H01G 7/028
[52] U.S. Cl. .................... 252/62.2; 361/523; 29/25.03; 529/422; 205/417
[58] Field of Search ........................ 252/62.2; 361/525; 29/25.03; 528/422; 205/417

[56] References Cited

U.S. PATENT DOCUMENTS

| | | | |
|---|---|---|---|
| 4,803,596 | 2/1989 | Hellwig et al. | 361/525 |
| 4,940,517 | 7/1990 | Wei | 204/78 |
| 5,454,147 | 10/1995 | Kobayashi et al. | 29/25.03 |
| 5,461,537 | 10/1995 | Kobayashi et al. | 361/525 |
| 5,567,209 | 10/1996 | Kobayashi et al. | 29/25.03 |
| 5,586,001 | 12/1996 | Amano et al. | 361/525 |

FOREIGN PATENT DOCUMENTS

| | | |
|---|---|---|
| 63-80517 | 4/1988 | Japan . |
| 60-37114 | 5/1991 | Japan . |

Primary Examiner—C. Melissa Koslow
Attorney, Agent, or Firm—Fish & Richardson P.C.

[57] ABSTRACT

A composition for forming an electrolyte for a solid electrolytic capacitor having excellent electric properties (capacitance, equivalent series resistance, dielectric loss, impedance, etc.) in a frequency zone ranging from a low frequency to a high frequency, and is capable of easily forming a high yield of the solid electrolytic capacitor having an excellent resistance to stress in the steps and a high thermal resistance, and a solid electrolytic capacitor produced from the electrolyte. The composition comprises (A) an aniline compound, (B) an organic sulfonic acid, (C) water, (D) an organic solvent, and if necessary, (E) a specified compound.

17 Claims, 2 Drawing Sheets

COMPOSITION FOR FORMING ELECTROLYTE FOR SOLID ELECTROLYTIC CAPACITOR AND SOLID ELECTROLYTIC CAPACITOR

BACKGROUND OF THE INVENTION

The present invention relates to a composition for forming an electrolyte for a solid electrolytic capacitor, and a solid electrolytic capacitor. In particularly, the present invention relates to a composition for forming an electrolyte for a solid electrolytic capacitor by chemical oxidative polymerization of aniline, and a solid electrolytic capacitor produced by forming an electrolyte from the composition.

In the structure of an ordinary solid electrolytic capacitor, the anode comprises a tantalum pellet called a valve metal or an aluminum foil with an expanded surface, dielectrics comprising an oxide film formed on the surface of the anode, and an electrolyte layer formed on the dielectrics comprising manganese dioxide ($MnO_2$), 7,7',8,8'-tetracyanoquinodimethane complex salt (TCNQ). However, since manganese dioxide has an insufficient conductivity of 0.1 S/cm, the solid electrolytic capacitor having the manganese dioxide electrolyte layer has a high impedance in a high-frequency zone and many layers of the manganese dioxide electrolyte which necessitates a high temperature must be formed by repeating the coating operation. Therefore, such a capacitor has an essential defect of leakage current. To overcome this defect, a reformation treatment for repairing the dielectric oxide film was necessitated after formation of each $MnO_2$ layer to make the electrolyte-formation steps complicated. The solid electrolytic capacitor having the TCNQ electrolyte layer had only a poor thermal resistance because TCNQ is molten at a temperature of not higher than the soldering temperature. Further, since the conductivity of TCNQ is as low as about 1 S/cm, it could not satisfy the requirements of capacitors having more excellent high-frequency characteristics. Under these circumstances, solid electrolytic capacitors having an electrolyte layer comprising a conductive polymer having a thermal resistance superior to that of TCNQ were proposed. For example, Japanese Patent Unexamined Published Application (hereinafter referred to as "J. P. KOKAI") No. Sho 60-37114 discloses a capacitor having an electrolyte layer comprising a conductive polymer which is a doped polymer of a five-membered heterocyclic compound. J. P. KOKAI No. Sho 63-80517 discloses a capacitor having an electrolyte layer prepared by forming a thin layer by coating with a solution of a polymer of a five-membered heterocyclic compound in a volatile solvent and doping the formed layer.

However, the process for forming the electrolyte comprising the conductive polymer described in J. P. KOKAI No. Sho 60-37114 comprises complicated steps because it is an electrolytic polymerization process. Particularly the mass production of a small capacitor element such as that of a tantalum solid electrolytic capacitor was difficult. In addition, it is usually very difficult to conduct such an electrode reaction on the dielectric surface of the insulating capacitor. In the process described in J. P. KOKAI No. Sho 63-80517 wherein the solution of the conductive polymer in the volatile solvent in insulation state is used for coating, it is impossible to form a conductive polymer layer of a sufficient thickness in the capacitor element and, therefore, the thermal resistance of the capacitor is poor. Another defect of this process is that since the density of the conductive polymer film is excessively brittle to cause a serious change due to a stress in the steps, the properties thereof became poor after encapsulating it by molding.

SUMMARY OF THE INVENTION

Figure 1:
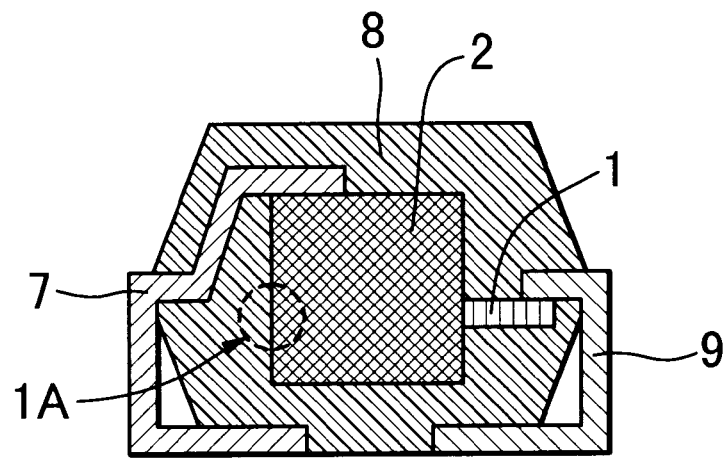
FIG. 1 is a cross-section of an embodiment of the solid electrolytic capacitor of the present invention.

The present invention provides a composition for easily forming a high yield of an electrolyte for a solid electrolytic capacitor, which has excellent electric properties (capacitance, equivalent series resistance, dielectric loss, impedance, etc.) in a frequency zone ranging from a low frequency to a high frequency, excellent resistance to stresses in the steps and a high thermal resistance.

The present invention provides another composition for forming an electrolyte for a solid electrolytic capacitor, which has excellent electric properties in a high-frequency zone in addition to the effects of the invention mentioned above.

The present invention provides yet another composition for forming an electrolyte for a solid electrolytic capacitor, which is capable of forming an electrolyte of a solid electrolytic capacitor having excellent thermal resistance and electric properties in a wide frequency zone ranging from a low frequency to a high frequency in addition to the effects of the two inventions previously mentioned.

The present invention further provides a composition for forming an electrolyte for a solid electrolytic capacitor, wherein a compound having formula (I) described hereinbelow (component (E)) has a high solubility and an aniline derivative also has a high solubility, and which also has the effects of the inventions previously mentioned.

The present invention still further provides a composition for forming an electrolyte for a solid electrolytic capacitor, wherein a solution has a high stability and a film thickness of the electrolyte formed by the chemical oxidative polymerization is uniform, and which also has the effects of the inventions previously mentioned.

The present invention provides a solid electrolytic capacitor, which comprises an electrolyte which can be easily formed and which has a high thermal resistance and excellent electric properties (capacitance, equivalent series resistance, dielectric loss, impedance, etc.) in a frequency zone ranging from a low frequency to a high frequency.

The present invention relates to a composition for forming an electrolyte for a solid electrolytic capacitor, which comprises:

(A) an aniline compound,
(B) an organic sulfonic acid,
(C) water, and
(D) an organic solvent.

Further the present invention includes a composition for forming an electrolyte for a solid electrolytic capacitor, which comprises components (A), (B), (C) and (D) and also:

(E) a compound of the general formula (I):

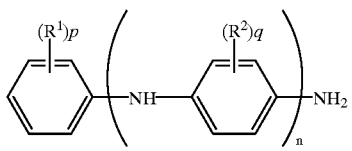

wherein $R^1$ and $R^2$ represent, independently from each other, an alkyl group having 1 to 6 carbon atoms, an alkenyl group having 1 to 6 carbon atoms, an alkoxyl group having 1 to 6 carbon atoms, a cycloalkyl group having 1 to 6 carbon atoms, cycloalkenyl group having 1 to 6 carbon atoms, or an alkanoyl group having 1 to 6 carbon atoms, p represents an integer of 0 to 5, q represents an integer of 0 to 4, and n represents an integer of 1 to 7.

The present invention also includes the composition for forming an electrolyte for a solid electrolytic capacitor, wherein the organic sulfonic acid (B) is phenolsulfonic acid, phenoldisulfonic acid, 2-sulfobenzoic acid, sulfosuccinic acid or 3-nitrobenzenesulfonic acid.

The present invention also includes the composition for forming an electrolyte for a solid electrolytic capacitor, wherein the organic solvent (D) is miscible with water in any proportion and the component (E) is soluble in the organic solvent (D).

The present invention also includes the composition for forming an electrolyte for a solid electrolytic capacitor, wherein n in the general formula (I) for the component (E) is 1.

The present invention also includes a solid electrolytic capacitor containing an electrolyte prepared from the composition for forming the electrolyte for the solid electrolytic capacitor.

DESCRIPTION OF THE PREFERRED EMBODIMENTS

The term "electrolyte" herein indicates a conductive substance used for attaining an electric contact between a dielectric film and a cathode after the formation of a thin oxide film as the dielectric film on the surface of a metal (valve metal) used as the anode of an electrolytic capacitor.

The aniline compounds (A) in the present invention are those of the general formula (II):

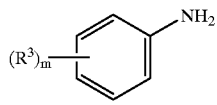

Wherein $R^3$ has the same meaning as that of $R^1$ in the general formula (I), and m represents an integer of 0 to 5. An aniline compound of the above formula wherein m represents 0 (zero), namely which has no substituent, is preferred because it is inexpensive and it forms a polyaniline of a high conductivity by the chemical oxidative polymerization.

The organic sulfonic acids (B) usable in the present invention are not particularly limited, and those known in the art are usable. However, in view of the thermal resistance and conductivity of the poly-anilines obtained by the chemical oxidative polymerization, preferred organic sulfonic acids (B) are benzenesulfonic acid, toluenesulfonic acid, n-hexanesulfonic acid, n-octylsulfonic acid, dodecylsulfonic acid, cetylsulfonic acid, 4-dodecyl benzenesulfonic acid, camphorsulfonic acid, poly(vinyl)sulfonic acid, dinonyl naphthalenesulfonic acid, naphthalenesulfonic acid, p-chlorobenzenesulfonic acid, phenolsulfonic acid, phenoldisulfonic acid, trichlorobenzenesulfonic acid, 4-nitrotoluene-2-sulfonic acid, 1-octanesulfonic acid, sulfonated poly-styrene, sulfonated polyethylene, nitrobenzenesulfonic acid, 2-sulfobenzoic acid, 3-nitrobenzenesulfonic acid, 4-octylbenzenesulfonic acid, 2-methyl-5-isopropylbenzenesulfonic acid, sulfosuccinic acid, etc. Among them, phenol-sulfonic acid, phenoldisulfonic acid, 2-sulfobenzoic acid, sulfosuccinic acid and 3-nitrobenzenesulfonic acid are particularly preferred in view of the thermal resistance and conductivity of the polyanilines obtained by the chemical oxidative polymerization. The organic sulfonic acid (B) may be used in combination with sulfuric acid.

Water (C) used in the present invention is preferably free of ionic impurities and organic substances. It is preferably treated by both ion exchange and distillation.

The organic solvents (D) in the present invention are not particularly limited and those known in the art are usable. It is preferred, however, that the organic solvent (D) is miscible with water in any desired ratio and that the component (E) used, if necessary, is soluble therein. The organic solvents (D) include lower alkyl alcohols such as methanol, ethanol, propanol and isopropanol; glycols such as ethylene glycol, diethylene glycol, triethylene glycol, propylene glycol, dipropylene glycol and tripropylene glycol; monoethers such as methyl cellosolve, ethyl cellosolve, methyl carbitol, ethyl carbitol, butyl carbitol, triethylene glycol monomethyl ether, triethylene glycol monobutyl ether, propylene glycol monomethyl ether, propylene glycol monopropyl ether and dipropylene glycol monomethyl ether; and diethers such as ethylene glycol dimethyl ether, ethylene glycol diethyl ether, diethylene glycol diethyl ether, diethylene glycol ethylmethyl ether, diglyme, triglyme and tetraethylene glycol dimethyl ether. It is possible to use a combination of two or three of them. Among these solvents, monoethers and diethers of glycols are preferred from the viewpoint of the solubility of the component (E) used if necessary.

It is preferred in the present invention to use a compound (E) of the general formula (I):

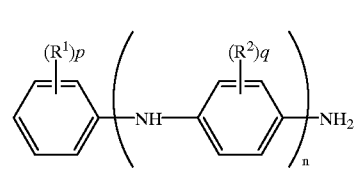

wherein $R^1$ and $R^2$ represent, independently from each other, an alkyl group having 1 to 6 carbon atoms, an alkenyl group having 1 to 6 carbon atoms, an alkoxyl group having 1 to 6 carbon atoms, a cycloalkyl group having 1 to 6 carbon atoms, cycloalkenyl group having 1 to 6 carbon atoms, or an alkanoyl group having 1 to 6 carbon atoms, p represents an integer of 0 to 5, q represents an integer of 0 to 4, and n represents an integer of 1 to 7, in addition to the components (A), (B), (C) and (D). By using the component (E), the chemical oxidative polymerization velocity can be increased and the electric characteristics of the formed polymer film can be improved and the properties of a capacitor in a high-frequency zone can be improved. n in the general formula (I) must be 1 to 7. When n is larger than 8, the life of the composition for forming the solid electrolyte of the present invention is short, and the conductivity of the polyaniline obtained by reacting this compound with an oxidizing agent inclines to be low. n is preferably 1 to 3, particularly 1.

The amount of the component (A) used in the present invention is preferably 0.2 to 23% by weight, more preferably 0.7 to 16% by weight and particularly 1 to 12% by weight, based on the total of the components (A), (B), (C), (D) and (E) which is used if necessary. When the amount of the component (A) is below 0.2% by weight, the thickness of the polyaniline film formed on the oxide film surface of the electrolytic capacitor inclines to be thin and, on the contrary, when it exceeds 23% by weight, the conductivity of the polyaniline film formed on the oxide film surface of the electrolytic capacitor inclines to be low.

The amount of the component (B) used in the present invention is preferably 0.2 to 25% by weight, more preferably 0.6 to 15% by weight and particularly 1 to 11% by weight, based on the total of the components (A), (B), (C), (D) and (E) which is used if necessary. When the amount of the component (B) is below 0.2% by weight, the thermal resistance of the polyaniline film formed on the oxide film surface of the electrolytic capacitor inclines to be low and, on the contrary, when it exceeds 25% by weight, the viscosity of the composition for forming the solid electrolyte of the present invention is excessively high and the degree of impregnation of the capacitor element therewith is lowered.

The amount of the component (C) used in the present invention is preferably 27 to 90% by weight, more preferably 33 to 85% by weight and particularly 38 to 80% by weight, based on the total of the components (A), (B), (C), (D) and (E) which is used if necessary. When the amount of the component (C) is below 27% by weight, the conductivity of the polyaniline film formed on the oxide film surface of the electrolytic capacitor inclines to be low and, on the contrary, when it exceeds 90% by weight, the solubility of the component (E), used if necessary, inclines to be low.

The amount of the component (D) used in the present invention is preferably 9.5 to 70% by weight, more preferably 15 to 60% by weight and particularly 20 to 50% by weight, based on the total of the components (A), (B), (C), (D) and (E) which is used if necessary. When the amount of the component (D) is below 9.5% by weight, the solubility of the component (E), used if necessary, inclines to be low and, on the contrary, when it exceeds 70% by weight, the conductivity of the polyaniline film formed on the oxide film surface of the electrolytic capacitor inclines to be low.

The amount of the component (E), used if necessary in the present invention, is preferably 0.02 to 2.5% by weight, more preferably 0.07 to 1.6% by weight and particularly 0.1 to 1.2% by weight, based on the total of the components (A), (B), (C), (D) and (E). When the amount of the component (E) is below 0.02% by weight, the sufficient effect thereof cannot be obtained and the uniformity of the thickness of the polyaniline film formed on the oxide film surface of the electrolytic capacitor inclines to be low and, on the contrary, when it exceeds 2.5% by weight, the stability of the composition for forming the solid electrolyte is lowered and the conductivity of the polyaniline film formed on the oxide film surface of the electrolytic capacitor inclines to be low.

The aniline compound (A), water (C) and organic solvent (D) in the present invention are preferably degassed. When they are not degassed and contain oxygen, the reaction for forming the electrolyte of the present invention starts before it is brought into contact with an oxidizing agent, or the conductivity of the polyaniline obtained by the chemical oxidative polymerization is lowered.

The electrolyte in the solid electrolytic capacitor of the present invention is formed from the above-described composition for forming the electrolyte of the solid electrolytic capacitor. The electrolyte is placed between the anode and the cathode. In an embodiment, the electrolyte is placed between the anode comprising a valve metal or the like (from which an anode lead is taken; usually the valve metal surface has an oxide film formed thereon) and the cathode comprising carbon or the like (from which a cathode lead is taken through a silver paste layer or the like). The valve metals include, for example, aluminum, tantalum, niobium, vanadium, titanium and zirconium. From the viewpoints of the permittivity and easiness of the formation of the oxide film, a aluminum foil or sintered tantalum with an expanded surface is preferred. The method for forming the oxide film on the valve metal film is not particularly limited, and any of known methods employed for the production of electrolytic capacitors can be employed. They include, for example, a method wherein the oxide film is formed by applying a voltage to an aluminum foil, having the expanded surface by etching, in an aqueous ammonium adipate solution, and a method wherein the oxide film is formed by applying a voltage to a pellet obtained by sintering fine tantalum powder in an aqueous nitric acid solution.

Figure 1A:
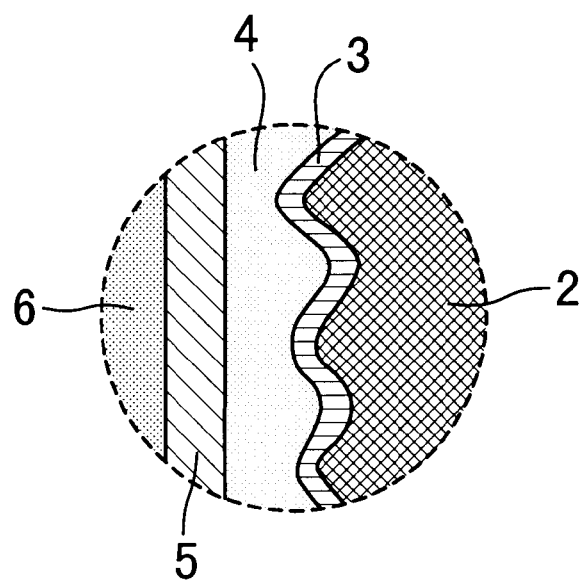
FIG. 1A is an enlarged view of a portion indicated by a reference numeral 1A of FIG. 1.
Figure 2:
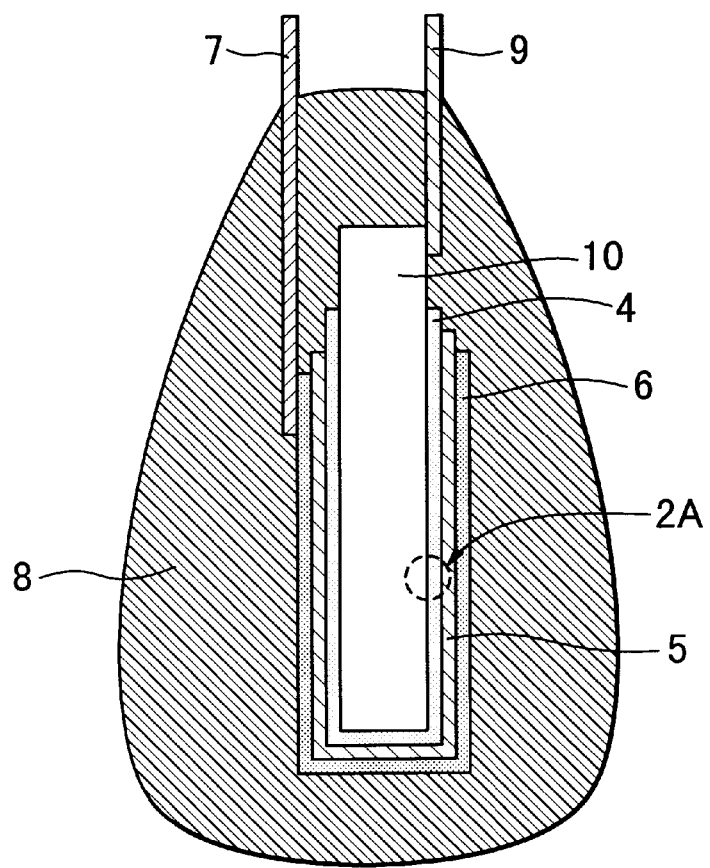
FIG. 2 is a cross-section of another embodiment of the solid electrolytic capacitor of the present invention.
Figure 2A:
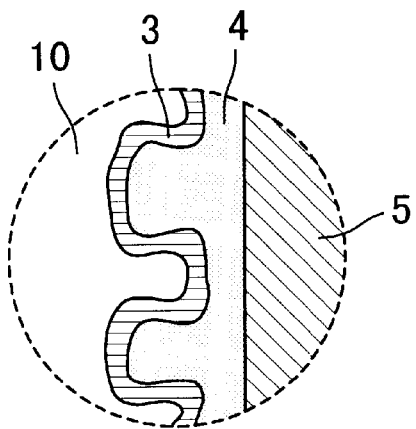
FIG. 2A is an enlarged view of a portion indicated by a reference numeral 2A of FIG. 2.

As examples of the solid electrolytic capacitors of the present invention, a solid electrolytic capacitor wherein tantalum is used as the valve metal is shown in FIG. 1 and FIG.1A, and that wherein aluminum is used as the valve metal is shown in FIG. 2 and FIG. 2A. In the solid electrolytic capacitor shown in FIG. 1 and FIG.1A wherein tantalum is used as the valve metal, an element comprises a tantalum pellet 2 coated with an oxide film 3 and having a lead terminal 1 inserted thereinto, an electrolyte 4 is formed on the oxide film 3, a carbon paste layer 5 and then a silver paste layer 6 are formed on the electrolyte 4 to form a laminate, the silver paste layer 6 is connected with a cathode lead 7, and the whole capacitor is encapsulated with an encapsulant 8. The lead terminal 1 is connected with an anode lead 9. In the solid electrolytic capacitor shown in FIG. 2 and FIG. 2A wherein aluminum is used as the valve metal, the element comprises an aluminum foil 10 connected with an anode lead 9 and coated with an oxide film 3, an electrolyte 4 is formed on the oxide film 3, a carbon paste layer 5 and then a silver paste layer 6 are formed on the electrolyte 4 to form a laminate, the silver paste layer 6 is connected with a cathode lead 7, and the whole capacitor is encapsulated with an encapsulant 8.

The solid electrolytic capacitor of the present invention can be produced by, for example, (i) impregnating an element, comprising a valve metal coated with an oxide film, with a solution containing 1 to 30% by weight of an oxidizing agent such as ammonium peroxodisulfate, potassium dichromate, potassium permanganate or ferrous sulfate, and drying the element (ii) impregnating the element with the composition for forming the electrolyte of the solid electrolytic capacitor of the present invention to polymerize the aniline compound and thereby to form a polyaniline, and drying the element; (iii) repeating the steps (i) and (ii) at least two times, preferably two to several tens of times; (iv) drying the element to volatize water and the like and to form an electrolyte layer; (v) adhering a carbon paste layer and then a silver paste layer on the electrolyte layer; and (vi) adhering the obtained element to a lead frame or the like by using a conductive adhesive, and if necessary, encapsulating it with an encapsulant.

The solid electrolytic capacitor of the present invention can be also produced by another method which comprises the steps of: (i) preparing a solution containing 1 to 30% by weight of an oxidizing agent and mixing the solution with the composition for forming the electrolyte of the solid electrolytic capacitor of the present invention to prepare a mixed solution, for example, mixing the solution or the oxidizing agent with the composition at a room temperature; (ii) impregnating an element composing a valve metal coated with an oxide film with the mixed solution thus obtained to polymerize the aniline compound and thereby to form a polyaniline and drying the element; (ii) repeating the step (ii) at least two times; (iv) drying the element to volatilize water and to form and electrolyte layer; (v) forming a carbon paste layer and then a silver paste layer on the electrolyte layer; and (vi) adhering the obtained element to a lead frame by using a conductive adhesive.

FIG. 1 is a cross-section of an embodiment of the solid electrolytic capacitor of the present invention wherein the valve metal is tantalum and FIG. 1A is an enlarged view of a portion indicated by a reference numeral 1A of FIG. 1. This capacitor can be produced by, for example, a process described below.

The tantalum pellet 2 prepared by sintering fine tantalum powder and having the lead terminal 1 is immersed in an aqueous nitric acid solution to form the oxide membrane 3 under 10 to 80 V. The prismatic pellet thus prepared from the sintered fine tantalum powder (porosity: 50 to 70%, design capacitance: 1 to 150 $\mu$F) and having a length of 1 to 3 mm, width of 0.8 to 2 mm and height of 1 to 5 mm is used. The tantalum pellet 2 having the oxide film 3 formed thereon is impregnated with the above-described oxidizing agent solution, dried with a hot air dryer at 40 to 120° C. for 5 to 60 minutes, further impregnated with the composition for forming an electrolyte for a solid electrolytic capacitor, left to stand at room temperature for at least three minutes and dried with the hot air dryer at 40 to 120° C. for 5 to 60 minutes. This impregnation step is repeated 5 to 30 times to form the electrolyte 4 comprising a polyaniline. The carbon paste layer 5 and then the silver paste layer 6 are formed. The cathode lead 7 is connected with the silver paste layer 6 by using a conductive paste. The lead terminal 1 is connected with the anode lead 9. Then the obtained product is encapsulated with the encapsulant 8 by molding to obtain the solid electrolytic capacitor containing tantalum as the valve metal.

FIG. 2 shows another embodiment of the solid electrolytic capacitor of the present invention containing aluminum as the valve metal. FIG. 2A is an enlarged view of a portion indicated by a reference numeral 2A of FIG. 2. The capacitor can be produced by, for example, as described below.

A foil of aluminum 10 (15 to 35 $\mu$F/cm$^2$) having an expanded surface by etching and having a thickness of 50 to 100 $\mu$m and an area of 5 cm to 2 cm ×1 cm to 5 cm (margin for welding: 0.1 to 0.4 cm, effective area: 0.3 to 9.6 cm$^2$) is processed in 5 to 20% aqueous ammonium adipate solution at 50 to 70° C. under 20 to 80 V to form the oxide film 3. Then, the obtained product is connected with the anode lead 9 to form the aluminum foil 10 having the oxide film 3 formed thereon. Then the aluminum foil 10 having the oxide film 3 is immersed in the above-described oxidizing agent solution, dried with a hot air dryer at 60 to 100° C. for 10 to 60 minutes, immersed in the composition for forming an electrolyte for a solid electrolytic capacitor, left to stand at room temperature for at least five minutes and dried with the hot air dryer at 60 to 100° C. for 10 to 60 minutes. This step is repeated 5 to 30 times to form the electrolyte 4 comprising a polyaniline. The carbon paste layer 5 and then the silver paste layer 6 are formed. The cathode lead 7 is connected with the silver paste layer 5 by using a conductive paste. Then the obtained product is encapsulated by the impregnation with the encapsulant 8 which is an epoxy resin to obtain the solid electrolytic capacitor containing aluminum as the valve metal.

The following Examples will further illustrate the present invention.

EXAMPLE 1

A composition for forming an electrolyte for a solid electrolytic capacitor having a composition shown in Table 1 was obtained from aniline (reagent; a product of Wako Pure Chemical Industries, Ltd.) degassed by bubbling with nitrogen for 30 minutes, degassed and ion-exchanged water, degassed ethanol (obtained by degassing the reagent of Wako Pure Chemical Industries, Ltd.), aniline dimer (p-aminodiphenylamine) (reagent; a product of Wako Pure Chemical Industries, Ltd.) and phenolsulfonic acid (reagent; a product of Wako Pure Chemical Industries, Ltd.). An oxidizing agent solution was prepared by dissolving 5 wt. % of ammonium peroxodisulfate (reagent; a product of Wako Pure Chemical Industries, Ltd.) in ion-exchanged water. A solid electrolytic capacitor was produced as described below.

A prismatic tantalum pellet prepared from the sintered fine tantalum powder (porosity: 60%, design capacitance: 3.3 $\mu$F) having a length of 1 mm, width of 1 mm and height of 1 mm and also having an oxide film formed in an aqueous nitric acid solution under 20 V was used. The tantalum pellet having the oxide membrane formed thereon was impregnated with the above-described oxidizing agent solution, dried with a hot air dryer at 80° C. for 20 minutes, further impregnated with a composition for forming an electrolyte for a solid electrolytic capacitor of the present invention shown in Table 1, left to stand at room temperature for ten minutes and dried with the hot air dryer at 80° C. for 20 minutes. The steps of impregnation with the oxidizing solution and the aniline solution were repeated 15 times to form an electrolyte comprising the polyaniline. The carbon paste layer and then the silver paste layer were formed thereon. A cathode lead was connected with the silver paste layer by using a silver paste. Then the obtained product was encapsulated by molding with an encapsulant to obtain the solid electrolytic capacitor containing tantalum as the valve metal. The electric characteristics of the obtained solid electrolytic capacitor are shown in Table 2.

EXAMPLE 2

A composition for forming an electrolyte for a solid electrolytic capacitor was obtained in the same manner as that of Example 1 except that phenolsulfonic acid in the composition of Example 1 for forming the electrolyte for the solid electrolytic capacitor was replaced with a mixture (reagent; a product of Wako Pure Chemical Industries, Ltd.) of phenoldisulfonic acid and sulfulric acid and that the mixing ratio was changed. Then, a solid electrolytic capacitor was obtained in the same manner as that of Example 1 except that the composition for forming the electrolyte for the solid electrolytic capacitor was changed and the number of times of the impregnation was also changed. The obtained composition for forming the electrolyte for the solid electrolytic capacitor is shown in Table 1, and the electric characteristics of the obtained solid electrolytic capacitor are shown in Table 2.

EXAMPLE 3

A composition for forming an electrolyte for a solid electrolytic capacitor was obtained in the same manner as that of Example 1 except that phenolsulfonic acid in the composition of Example 1 for forming the electrolyte for the solid electrolytic capacitor was replaced with sulfobenzoic acid (reagent; a product of Aldrich), that the mixing ratio was changed and that ethanol was replaced with diglyme. Then, a solid electrolytic capacitor was obtained in the same manner as that of Example 1 except that the composition for forming the electrolyte for the solid electrolytic capacitor was changed and the number of times of the impregnation was also changed. The obtained composition for forming the electrolyte for the solid electrolytic capacitor is shown in Table 1, and the electric characteristics of the obtained solid electrolytic capacitor are shown in Table 2.

EXAMPLE 4

A composition for forming an electrolyte for a solid electrolytic capacitor was obtained in the same manner as that of Example 1 except that phenolsulfonic acid in the composition of Example 1 for forming the electrolyte for the solid electrolytic capacitor was replaced with sulfosuccinic acid (reagent; a product of Aldrich) and that the mixing ratio was changed. Then, a solid electrolytic capacitor was obtained in the same manner as that of Example 1 except that the composition for forming the electrolyte for the solid electrolytic capacitor was changed and that the numbers of times of the impregnation and drying steps were also changed. The obtained composition for forming the electrolyte for the solid electrolytic capacitor is shown in Table 1, and the electric characteristics of the obtained solid electrolytic capacitor are shown in Table 2.

EXAMPLE 5

A composition for forming an electrolyte for a solid electrolytic capacitor was obtained in the same manner as that of Example 1 except that phenolsulfonic acid in the composition of Example 1 for forming the electrolyte for the solid electrolytic capacitor was replaced with 3-nitrobenzenesulfonic acid (reagent; a product of Tokyo Kasei Kogyo KK), that ethanol was replaced with ethylene glycol and that the mixing ratio was changed. Then, a solid electrolytic capacitor was obtained in the same manner as that of Example 1 except that the composition for forming the electrolyte for the solid electrolytic capacitor was changed and the numbers of times of the impregnation and drying steps were also changed. The obtained composition for forming the electrolyte for the solid electrolytic capacitor is shown in Table 1, and the electric characteristics of the obtained solid electrolytic capacitor are shown in Table 2.

EXAMPLE 6

A composition for forming an electrolyte for a solid electrolytic capacitor was obtained in the same manner as that of Example 1 except that phenolsulfonic acid in the composition of Example 1 for forming the electrolyte for the solid electrolytic capacitor was replaced with a mixture of phenolsulfonic acid and sulfulric acid and that the mixing ratio was changed. Then, a solid electrolytic capacitor was obtained in the same manner as that of Example 1 except that the composition for forming the electrolyte for the solid electrolytic capacitor was changed and that the numbers of times of the impregnation and drying steps were also changed. The obtained composition for forming the electrolyte for the solid electrolytic capacitor is shown in Table 1, and the electric characteristics of the obtained solid electrolytic capacitor are shown in Table 2.

EXAMPLE 7

A composition for forming an electrolyte for a solid electrolytic capacitor was obtained in the same manner as that of Example 1. Then an oxidizing agent solution was prepared by dissolving 5% by weight of ammonium peroxodisulfate in ion-exchanged water. A solid electrolytic capacitor was produced as described below.

An aluminum foil (25 $\mu F/cm^2$) with an expanded surface by etching and having a thickness of 70 $\mu$m and an area of 1 cm×1.2 cm (margin for welding: 0.2 cm, effective area: 1 $cm^2$) was processed in 10% aqueous ammonium adipate solution at 60° C. under 40 V to form an oxide film. Then, the aluminum foil having the oxide film was immersed in the above-described oxidizing agent solution, dried with a hot air dryer at 80° C. for 20 minutes, immersed in the composition for forming an electrolyte for a solid electrolytic capacitor of the present invention shown in Table 1, left to stand at room temperature for ten minutes and dried with the hot air dryer at 80° C. for 20 minutes. The steps of impregnation with the oxidizing solution and the aniline solution were repeated 15 times to form the electrolyte comprising the polyaniline. The carbon paste layer and then the silver paste layer were formed. The cathode lead 8 was connected with the silver paste layer by using a silver paste. Then the obtained product was encapsulated by the impregnation with an epoxy resin to obtain the solid electrolytic capacitor containing aluminum as the valve metal. The obtained composition for forming the electrolyte for the solid electrolytic capacitor is shown in Table 1, and the electric characteristics of the obtained solid electrolytic capacitor are shown in Table 2.

EXAMPLE 8

A solid electrolytic capacitor containing tantalum as the valve metal was produced in the same manner as that of Example 1 except that the component (E) (p-aminodiphenylamine) was not used. The composition used for forming the electrolyte is shown in Table 1, and the electric characteristics of the obtained solid electrolytic capacitor are shown in Table 2.

EXAMPLE 9

The same solution of the composition for forming the electrolyte as that of Example 8 was mixed with the same oxidizing agent solution as that of Example 1 in a volume ratio of 1:1 to obtain a liquid mixture. Then the same tantalum pellet having the oxide membrane as that of Example 1 was impregnated with the liquid mixture and then dried with the hot air dryer at 60° C. for 20 minutes. These impregnation and drying steps were repeated 15 times to form the electrolyte comprising the polyaniline. In this process, the fresh liquid mixture was used in each impregnation and drying steps. The carbon paste layer and then the silver paste layer were formed. The cathode lead was connected with the silver paste layer by using a silver paste. Then the obtained product was encapsulated by the molding with an encaplulant to obtain the solid electrolytic capacitor containing tantalum as the valve metal. The electric characteristics of the obtained solid electrolytic capacitor are shown in Table 2.

EXAMPLE 10

A composition for forming an electrolyte for a solid electrolytic capacitor was obtained in the same manner as that of Example 1 except that phenolsulfonic acid in the composition of Example 1 for forming the electrolyte for the solid electrolytic capacitor was replaced with sulfosuccinic acid (reagent; a product of Aldrich) and that the mixing ratio was changed and the component (e) (p-aminodiphenylamine) was not used.

The composition for forming an electrolyte for a solid electrolytic capacitor described above was mixed with the same oxidizing agent solution as that of Example 1 in a volume ratio of 1:1 to obtain a liquid mixture. Then the same tantalum pellet having the oxide membrane as that of Example 1 was impregnated with the liquid mixture and then dried with the hot air dryer at 60° C. for 20 minutes. These impregnation and drying steps were repeated 15 times to form the electrolyte comprising the polyaniline. In this process, the fresh liquid mixture was used in each impregnation and drying steps. The carbon paste layer and then the silver paste layer were formed. The cathode lead was connected with the silver paste layer by using a silver paste. Then the obtained product was encapsulated by the molding with an encaplulant to obtain the solid electrolytic capacitor containing tantalum as the valve metal. The obtained composition for forming the electrolyte for the solid electrolytic capacitor is shown in Table 1 and the electric characteristics of the obtained solid electrolytic capacitor are shown in Table 2.

Comparative Example 1

A solid electrolytic capacitor containing tantalum as the valve metal was produced in the same manner as that of Example 3 except that the component (B) of the present invention was not used. The obtained composition for forming the electrolyte of the solid electrolytic capacitor is shown in Table 3, and the electric characteristics of the obtained solid electrolytic capacitor are shown in Table 4.

Comparative Example 2

A solid electrolytic capacitor was produced in the same manner as that of Example 1 except that hydrochloric acid was used as the component (B) of the present invention. The obtained composition for forming the electrolyte of the solid electrolytic capacitor is shown in Table 3, and the electric characteristics of the obtained solid electrolytic capacitor are shown in Table 4.

Comparative Example 3

A solid electrolytic capacitor containing tantalum as the valve metal was produced in the same manner as that of Example 5 except that the component (D) of the present invention was not used. The obtained composition for forming the electrolyte of the solid electrolytic capacitor is shown in Table 3, and the electric characteristics of the obtained solid electrolytic capacitor are shown in Table 4.

TABLE 1

| Component | | Amount (Parts by weight) Example | | | | | | | | |
|---|---|---|---|---|---|---|---|---|---|---|
| | | 1 | 2 | 3 | 4 | 5 | 6 | 7 | 8 | 10 |
| (A) | Aniline | 2 | 2 | 5 | 1 | 3 | 4 | 2 | 2 | 2 |
| (B) | Phenolsulfonic acid | 2 | — | — | — | 2 | 1 | 2 | 2 | — |
| (B) | Phenoldisulfonic acid | — | 0.3 | — | — | — | — | — | — | — |
| (B') | Sulfuric acid | — | 2.7 | — | — | — | 3 | — | — | — |
| (B) | Sulfobenzoic acid | — | — | 5.8 | — | — | — | — | — | — |
| (B) | Sulfosuccinic acid | — | — | — | 1.2 | — | — | — | — | 2 |
| (B) | 3-Nitrobenzene-sulfonic acid | — | — | — | — | 3.5 | — | — | — | — |
| (C) | Water | 48 | 60 | 60 | 40 | 65 | 50 | 48 | 48 | 48 |
| (D) | Ethanol | 47.8 | 35.9 | — | 57 | — | 41.7 | 47.8 | 47.8 | 48 |
| (D) | Diglyme | — | — | 28.7 | — | — | — | — | — | — |
| (D) | Ethylene glycol | — | — | — | — | 28.2 | — | — | — | — |
| (E) | p-Aminodiphenylamine | 0.2 | 0.1 | 0.5 | 0.8 | 0.3 | 0.3 | 0.2 | — | — |
| Oxidizing agent solution | Conc. of ammonium peroxodisulfate (wt. %) | 5 | 5 | 12.5 | 3 | 8 | 5 | 5 | 5 | 5 |
| Number of impregnating and drying steps | | 20 | 20 | 8 | 35 | 13 | 10 | 20 | 20 | 20 |

TABLE 2

| | 120 Hz Capacitance ($\mu$F) | 100 kHz Capacitance ($\mu$F) | 100 kHz Equivalent series resistance ($\Omega$) |
|---|---|---|---|
| Ex. 1 | 3.35 | 2.6 | 0.55 |
| Ex. 2 | 3.30 | 2.3 | 0.65 |
| Ex. 3 | 3.25 | 2.15 | 0.7 |
| Ex. 4 | 3.40 | 2.4 | 0.6 |
| Ex. 5 | 3.30 | 2.25 | 0.75 |
| Ex. 6 | 3.30 | 2.2 | 0.6 |
| Ex. 7 | 26.0 | 20.0 | 0.12 |
| Ex. 8 | 3.1 | 1.6 | 2.5 |
| Ex. 9 | 3.10 | 2.6 | 1.00 |
| Ex. 10 | 3.3 | 2.6 | 0.4 |

Comparative Example 4

A solid electrolytic capacitor containing aluminum as the valve metal was produced in the same manner as that of Example 7 except that the component (E) of the present invention was not used. The obtained composition for forming the electrolyte of the solid electrolytic capacitor is shown in Table 3, and the electric characteristics of the obtained solid electrolytic capacitor are shown in Table 4.

Comparative Example 5

A tantalum pellet having an oxide film prepared in the same manner as that of Example 1 was impregnated with 2 wt. % solution of polyaniline powder in N-methyl-2-pyrrolidone and then dried. After repeating this step 20 times, the pellet was immersed in an aqueous phenolsulfonic acid solution at 60° C. for 5 hours and then washed with acetone to form an electrolyte layer. The carbon paste layer and then the silver paste layer were formed thereon. The cathode lead was connected with the silver paste layer by using a silver paste. Then the obtained product was encapsulated by the molding with an encaplulant to obtain the solid electrolytic capacitor of the present invention containing tantalum as the valve metal. The electric characteristics of the obtained solid electrolytic capacitor are shown in Table 4.

TABLE 3

| Component | | Amount (Parts by weight) Comparative Example | | | |
|---|---|---|---|---|---|
| | | 1 | 2 | 3 | 4 |
| (A) | Aniline | 5 | 5 | 3 | 2 |
| (B) | Phenolsulfonic acid | — | — | — | 2 |
| (B) | Phenoldisulfonic acid | — | — | — | — |
| (B') | Hydrochloric acid | — | 2 | — | — |
| (B) | Sulfobenzoic acid | — | — | — | — |
| (B) | Sulfosuccinic acid | — | — | — | — |
| (B) | 3-Nitrobenzene-sulfonic acid | — | — | 3.5 | — |
| (C) | Water | 60 | 48 | 93.2 | 48 |
| (D) | Ethanol | — | 47.8 | — | 47.8 |
| (D) | Diglyme | 28.7 | — | — | — |
| (D) | Ethylene glycol | — | — | — | — |
| (E) | p-Aminodiphenylamine | 0.5 | 0.3 | 0.3 | — |
| Oxidizing agent solution | Conc. of ammonium per oxodisulfate (wt. %) | 12.5 | 5 | 8 | 5 |
| Number of impregnating and drying steps | | 8 | 20 | 13 | 20 |

TABLE 4

| | 120 Hz Capacitance ($\mu F$) | 100 kHz Capacitance ($\mu F$) | 100 kHz Equivalent series resistance ($\Omega$) |
|---|---|---|---|
| Comp. Ex. 1 | 2.2 | 0.2 | 7 |
| Comp. Ex. 2 | 1.3 | 0 | 25 |
| Comp. Ex. 3 | 3.1 | 1.5 | 3.1 |
| Comp. Ex. 4 | 25 | 8 | 1.8 |
| Comp. Ex. 5 | 2.5 | 0.5 | 8 |

It is apparent from Tables 2 and 4 that the solid electrolytic capacitors obtained in Examples 1 to 9 are superior to those obtained in Comparative Examples 1 to 5 in both low-frequency properties and high-frequency properties.

As stated above and shown in Tables 1, 2 and 3, the composition for forming the electrolyte for the solid electrolytic capacitor of the present invention has excellent electric properties (capacitance, equivalent series resistance, dielectric loss, impedance, etc.) in a frequency zone ranging from a low frequency to a high frequency, and is capable of easily forming a high yield of the solid electrolytic capacitor having an excellent resistance to stress in the steps and a high thermal resistance.

The composition for forming an electrolyte for a solid electrolytic capacitor of the present invention further has excellent electric properties in a high-frequency zone in addition to the effects of the composition previously mentioned.

The composition for forming an electrolyte for a solid electrolytic capacitor of the present invention has excellent electric properties in a wide frequency zone ranging from a low frequency to a high frequency in addition to the effects of the composition previously mentioned.

The composition for forming an electrolyte for a solid electrolytic capacitor of the present invention has a high solubility of the component (E) and aniline derivative (A) in addition to the effects of the composition previously mentioned.

The composition for forming an electrolyte for a solid electrolytic capacitor of the present invention has a high stability of the solution and uniform thickness of the electrolyte film formed by the chemical oxidative polymerization in addition to the effects of the composition previously mentioned.

The solid electrolytic capacitor of the present invention comprises an electrolyte which can be easily formed and which has a high thermal resistance and excellent electric properties (capacitance, equivalent series resistance, dielectric loss, impedance, etc.) in a frequency zone ranging from a low frequency to a high frequency.

What is claimed is:

1. A composition for forming an electrolyte for a solid electrolytic capacitor, which comprises:

(A) an aniline compound,
    (B) an organic sulfonic acid,
    (C) water, and
    (D) an organic solvent;

wherein the organic sulfonic acid (B) comprises at least one of the organic sulfonic acids selected from the group consisting of phenolsulfonic acid, phenoldisulfonic acid, 2-sulfobenzoic acid, sulfosuccinic acid and 3-nitrobenzenesulfonic acid.

2. The composition of claim 1 which further comprises (E) a compound of the general formula (I):

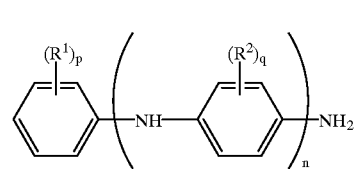

(I)

wherein $R^1$ and $R^2$ represent, independent from each other, an alkyl group having 1 to 6 carbon atoms, an alkenyl group having 2 to 6 carbon atoms, an alkoxyl group having 1 to 6 carbon atoms, a cycloalkyl group having 3 to 6 carbon atoms, a cycloalkenyl group having 3 to 6 carbon atoms, or an alkanoyl group having 1 to 6 carbon atoms, p represents an integer of 0 to 5, q represents an integer of 0 to 4, and n represents an integer of 1 to 7.

3. The composition of claim 2 wherein n is 1 to 3.

4. The composition of claim 2 wherein n is 1.

5. The composition of claim 1 wherein the aniline compound (A) is the compound of the general formula (II):

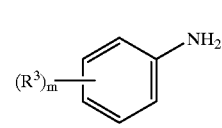

(II)

wherein $R^3$ represents an alkyl group having 1 to 6 carbon atoms, an alkenyl group having 2 to 6 carbon atoms, an alkoxyl group having 1 to 6 carbon atoms, a cycloalkyl group having 3 to 6 carbon atoms, cycloalkenyl group having 3 to 6 carbon atoms, or an alkanoyl group having 1 to 6 carbon atoms, and m represents an integer of 0 to 5.

6. The compound of claim 5 wherein the aniline compound (A) is an aniline.

7. The composition of claim 1 wherein the organic solvent (D) is miscible with water in any proportion and the compound (E) is soluble in the organic solvent(D).

8. The composition of claim 1 wherein at least one of the aniline compound (A), water (C) and organic solvent (D) is degassed.

9. The composition of claim 1 wherein the aniline compound (A) is present in an amount of from 0.2 to 23% by weight based on the total weight of the composition.

10. The composition of claim 1 wherein the organic sulfonic acid (B) is present in an amount of 0.2 to 25% by weight, based on the total weight of the composition.

11. The composition of claim 2 wherein the compound (E) is present in an amount of 0.02 to 2.5% by weight, based on the total weight of the composition.

12. The composition of claim 11 wherein the compound (E) is present in an amount of 0.07 to 1.6% by weight, based on the total weight of the composition.

13. The composition of claim 12 wherein the compound (E) is present in an amount of 0.1 to 1.2% by weight, based on the total weight of the composition.

14. A solid electrolytic capacitor containing an electrolyte prepared from the composition of claim 1.

15. A solid electrolytic capacitor containing an electrolyte prepared from the composition of claim 2.

16. A method for the production of solid electrolytic capacitor which comprises the steps of:
  (i) impregnating an element, comprising a valve metal coated with an oxide film, with a solution containing 1 to 30% by weight of an oxidizing agent and drying the element;
  (ii) impregnating the element with the composition for forming the electrolyte of the solid electrolytic capacitor of claim 1 or 2 to polymerize the aniline compound and thereby to form a polyaniline, and drying the element;
  (iii) repeating the steps (i) and (ii) at least two times;
  (iv) drying the element to volatilize water and to form an electrolyte layer;
  (v) forming a carbon paste layer and then a silver paste layer on the electrolyte layer; and
  (vi) adhering the obtained element to a lead frame by using a conductive adhesive.

17. A method for production of solid electrolytic capacitor which comprises the steps of:
  (i) preparing a solution containing 1 to 30% by weight of an oxidizing agent and mixing the solution with the composition of claim 1 to prepare a mixed solution;
  (ii) impregnating an element composing a valve metal coated with an oxide film with the mixed solution to polymerize the aniline compound and thereby to form a polyaniline and drying the element;
  (iii) repeating the step (ii) at least two times;
  (iv) drying the element to volatilize water and to form an electrolyte layer;
  (v) forming a carbon paste layer and then a silver paste layer on the electrolyte layer; and
  (vi) adhering the obtained element to a lead frame by using a conductive adhesive.

* * * * *

UNITED STATES PATENT AND TRADEMARK OFFICE
CERTIFICATE OF CORRECTION

PATENT NO.      : 6,042,740
DATED           : MARCH 28, 2000
INVENTOR(S)     : HIDEAKI UEHARA, TORU YOSHIKAWA, YAN HU, SHOUICHI SASAKI,
                  YASUHIRO YANO, AND TAKAFUMI DOUDOU

It is certified that error appears in the above-identified patent and that said Letters Patent is hereby corrected as shown below:

Col. 6, line 56, after "element" insert --;-- (semicolon);

Col. 6, line 61, after "preferably" insert --,-- (comma);

Col. 6, line 63, change "adhering" to --forming--.

Col. 7. line 7, change "or" to --of--;

Col. 7, line 12, after "element;" change "(ii)" to --(iii)--.

Signed and Sealed this

Twenty-seventh Day of March, 2001

*Attest:*

*Attesting Officer*

NICHOLAS P. GODICI

*Acting Director of the United States Patent and Trademark Office*